US010821549B2

(12) United States Patent
Rutstein

(10) Patent No.: US 10,821,549 B2
(45) Date of Patent: Nov. 3, 2020

(54) CUSTOMIZED PIECES AND METHOD OF MAKING CUSTOMIZED PIECES FROM SEMI-PRECIOUS GEMSTONES

(71) Applicant: Opulent Luxuries LLC, Stamford, CT (US)

(72) Inventor: Jeffrey S Rutstein, Stamford, CT (US)

(73) Assignee: Opulent Luxuries, LLC, Stamford, CT (US)

( * ) Notice: Subject to any disclaimer, the term of this patent is extended or adjusted under 35 U.S.C. 154(b) by 329 days.

(21) Appl. No.: 15/959,038

(22) Filed: Apr. 20, 2018

(65) Prior Publication Data
US 2018/0311767 A1 Nov. 1, 2018

Related U.S. Application Data

(60) Provisional application No. 62/492,027, filed on Apr. 28, 2017.

(51) Int. Cl.
| | |
|---|---|
| B23K 26/18 | (2006.01) |
| B23K 26/40 | (2014.01) |
| A47G 33/00 | (2006.01) |
| B44C 1/22 | (2006.01) |
| B44C 3/06 | (2006.01) |
| C03C 23/00 | (2006.01) |
| C03C 17/32 | (2006.01) |
| B28D 5/00 | (2006.01) |
| B23K 101/00 | (2006.01) |
| B23K 103/00 | (2006.01) |

(Continued)

(52) U.S. Cl.
CPC ............ *B23K 26/18* (2013.01); *A47G 33/004* (2013.01); *B23K 26/40* (2013.01); *B44C 1/228* (2013.01); *B44C 3/06* (2013.01); *C03C 17/32* (2013.01); *C03C 23/0025* (2013.01); *B23K 2101/007* (2018.08); *B23K 2103/50* (2018.08); *B28D 5/00* (2013.01); *B41M 5/24* (2013.01); *B41M 5/262* (2013.01)

(58) Field of Classification Search
CPC ...................................................... B23K 26/18
USPC ...................................................... 428/542.4
See application file for complete search history.

(56) References Cited

U.S. PATENT DOCUMENTS

| | | | |
|---|---|---|---|
| 468,758 A | 2/1892 | Baynes | |
| 2,062,865 A * | 12/1936 | Cleveland | ............... C04B 41/50 451/31 |
| 3,489,564 A | 1/1970 | Schaefer | |

(Continued)

OTHER PUBLICATIONS

"Trophies," TrophyPartner.com Excellentia Marketing Inc./Trophy Partner.com, 2004. Online catalog (p. 1 only).

*Primary Examiner* — Brent T O'Hern
(74) *Attorney, Agent, or Firm* — Neil D. Gershon

(57) ABSTRACT

A method of making a customized item from a single piece of quartz, the method comprising the steps of providing a piece of quartz of sufficient size and shape to form the item, carving the item out of the single piece of quartz into a desired shape, etching information into the item and applying a coating to the information after the step of etching the information to form the customized item. A customized item is also provided comprising a body formed of a single piece of quartz, the body shaped into a configuration simulating a home or a sports object, and including personalized information etched into the quartz and a coating over the personalized information to enhance visibility.

19 Claims, 5 Drawing Sheets

(51) Int. Cl.
   *B41M 5/26*   (2006.01)
   *B41M 5/24*   (2006.01)

(56) References Cited

U.S. PATENT DOCUMENTS

| | | |
|---|---|---|
| 3,664,913 A | 5/1972 | Ratcliff |
| 4,425,769 A | 1/1984 | Hakoune |
| 4,467,172 A | 8/1984 | Ehrenwald et al. |
| 5,410,125 A | 4/1995 | Winston et al. |
| 5,599,594 A | 2/1997 | Pauley |
| 5,763,053 A | 6/1998 | Amin |
| 6,025,060 A | 2/2000 | Meissner |
| 6,211,484 B1 | 4/2001 | Kaplan et al. |
| 6,406,773 B1 | 6/2002 | Hendrickson |
| 6,710,943 B2 | 3/2004 | Weir |
| 6,828,034 B2 | 12/2004 | Banman |
| 7,114,262 B2 | 10/2006 | Andrewes |
| 2004/0157527 A1 | 8/2004 | Omar |
| 2006/0102854 A1 | 5/2006 | Neogi et al. |
| 2006/0210820 A1 | 9/2006 | Rutstein |

\* cited by examiner

CUSTOMIZED PIECES AND METHOD OF MAKING CUSTOMIZED PIECES FROM SEMI-PRECIOUS GEMSTONES

This application claims priority from provisional application Ser. No. 62/492,027, filed Apr. 28, 2017, the entire contents of which are incorporated herein by reference.

BACKGROUND OF THE INVENTION

Field of the Invention

This application relates to customized pieces made from semi-precious gemstones, and more particularly customized pieces formed from the mineral quartz that contain personalized information, and the method of making such customized pieces from a single gemstone.

Background

The demand for unique personalized items is well known. Such personalized items are desirable in the sports area such as for awards, trophies and sports memorabilia. Many current trophies and awards lack uniqueness which is highly desirable for athletes and fans.

The demand for unique personalized items in the luxury goods market such as wine glasses, cups or decorative items is also well known. Currently, these personal items lack the uniqueness among items. Many luxury items are formed for example from well-known materials such as crystal or sterling silver. However, these items vary in quality and also manufactured in bulk so that they are not individualized. Even if personalized, the actual item itself will not differ from other items except for the personalized information.

The existence of semi-precious gemstones is known. However, to date, uniquely formed personalized objects obtained from carving semiprecious gemstones with easily discernible designs, logos, writings, etc. are not available.

In U.S. patent publication 2006/0210820, an attempt was made to form plaques or trophies from semi-precious gemstones. In this publication, utilizing minerals that could be cut or polished were disclosed, and further disclosed was a list of potential semiprecious gemstones. This publication further described sculpting the gemstone from various objects, attaching the objects to a pedestal to form trophies and etching an image in the stone. Although this publication does disclose creating objects from semi-precious gemstones, it fails to disclose or appreciate enhancements which improve visibility of the images or information formed into the gemstone. Also, with the expense of such stones, it is essential that the personalized information easily readable/visible. The patent publication also fails to appreciate that sculpting (carving) and etching the gemstones is a delicate process and if not done properly, splintering and excessive waste can result. In fact, if not done properly, the gemstone could break or crack and therefore not even be usable (salvageable). Due to the expense of the gemstones themselves, this would greatly increase the cost since another gemstone would need to be utilized. Therefore, it would be advantageous to minimize the chances of splintering or breaking the gemstone during the etching process. Moreover, the publication fails to appreciate that improved manufacturing techniques would reduce costs by minimizing breaking of the stone during manufacture and the publication further fails to achieve cost reduction by expediting the process of the personalization of the stone. It would be advantageous to ensure more consistent placement of the personalized information on the gemstone and that could be readily discerned in varying environments, and such placement achieved in a cost effective manner. Therefore, the need exists for high level customized items in various fields such as luxury goods, sports, awards, etc. that provide a level of uniqueness not currently available.

SUMMARY OF THE INVENTION

The present invention is directed to customized/personalized pieces (items) formed from a single piece of semi-precious gemstone and the method of manufacturing such customized/personalized pieces. The gemstone is carved/sculpted into a specific (unique) shape/configuration and then etched to personalize the piece to create the finished product. Certain steps in the process, described in more detail below, are utilized to maximize efficiency and minimize costs of creating the finished products. Other steps in the process facilitate the personalization process as well as enhance the visibility in varying environments of the personalized information etched into the piece.

In accordance with one aspect of the present invention, a method of making a customized item from a single piece of quartz is provided. The method comprises the steps of:
  providing a piece of quartz of sufficient size and shape to form the item;
  carving the item out of the single piece of quartz into a desired shape;
  etching information into the item; and
  applying a coating to the information after the step of etching the information to form the customized item.

In some embodiments, the method further comprises the step of placing a tape over a region of the gemstone and etching the information on the tape. The method can further comprise the step of cutting away the tape surrounding the information leaving areas of the tape overlying the etching in the quartz. In some embodiments, the step of etching the information includes laser etching the information into the item.

In preferred embodiments, the item has a thickness equal to or greater than ¼ inch.

In some embodiments, the coating is a sealant applied like a polish to block refraction of light. In some embodiments, the step of applying the coating applies the coating to voids in the etched information and extracts the image formed of the etched information. In preferred embodiments, the coating is a beeswax.

In some embodiments, the tape is applied to the quartz in a manner to avoid trapping air under the tape.

The customized finished product can be in various forms and can include for example, a trophy, a sports object, a home product, etc.

In accordance with another aspect of the present invention, a customized item made from a single piece of quartz is provided comprising a body formed of a single piece of quartz, the body shaped into a configuration simulating a home or a sports object, personalized information etched into the quartz, and a coating over the personalized information to enhance visibility.

In some embodiments, the item has a thickness equal to or greater than ¼ inch.

In some embodiments, the sealant contains bees wax. In some embodiments, the sealant fills voids in the etched information and extracts the image formed in the etched information.

In some embodiments, the sports object simulates a sports equipment item. In some embodiments, the home object is in the shape of a glass or a bowl.

DESCRIPTION OF THE DRAWINGS

Preferred embodiment(s) of the present disclosure are described herein with reference to the drawings wherein:

FIG. 8 is a front perspective of an alternate embodiment of the customized pieces of the present invention in the form of a pair of candlesticks each formed of a single gemstone; and.

DESCRIPTION OF PREFERRED EMBODIMENTS

The present invention is directed to customized pieces formed from a single piece of semi-precious gemstone and the method of forming/manufacturing the customized piece. The terms "pieces," "objects" and "items" are used interchangeably throughout the application. The terms "customized item" and personalized item" are also used interchangeably. There are two aspects of the customized piece: 1) the shape/form of the piece which is made from a single piece of quartz into a unique form for an individual consumer; and 2) information etched into the gemstone which is also unique to the individual consumer. Additionally, the term "final product" or "final piece" as used herein denotes the customized piece after it is carved into the desired shape and the personal information is etched into the piece, and treated as described below, ready for transport to the customer.

The gemstone utilized to form the piece is preferably amethyst crystal or crystal quartz which provides unique advantages. The mineral quartz, (chemical formula $SiO_2$) is usually quite pure and this results in a crystalline structure that is quite uniform in hardness in all directions. Thus, the quartz gemstone provides a hard material that cannot easily break. In contrast, minerals such as fluorite, calcite, etc., are not uniform directionally and therefore are more difficult to fabricate into desired shapes. In addition, quartz does not have a pronounced cleavage habit which allows the mineral to break in preferential directions. Thus, as a result of its composition and crystal structure, quartz masses tend to be directionally uniform with respect to breakage to provide a strong personalized item. Further, being directionally uniform, etching of exterior surfaces is more feasible.

Additionally, quartz is harder than most common minerals. This allows for shape stability after mechanical shaping and etching. Other softer minerals would be less stable and more prone to splintering or breaking.

Therefore, although other gemstones (preferably non-opaque stones) can be attempted to be used to form the personalized items of the present invention, quartz is the preferred material as it provides the strength and ideal surface and structure for etching. In preferred embodiments, the gemstone is minimum 1000 carrots "Rough" semi-precious stone. In preferred embodiments, the gemstone is "A" grade (in reference to color, quality, symmetry, etc.) meaning it is clear and translucent with some inclusions.

The unique process for making the final piece involves a series of steps described in detail below and illustrated in the flow chart of FIG. 9.

Figure 1:
FIG. 1 is a front perspective view of one embodiment of the customized piece of the present invention showing a spherical shape atop a support (stand) formed from a single gemstone.
Figure 2:
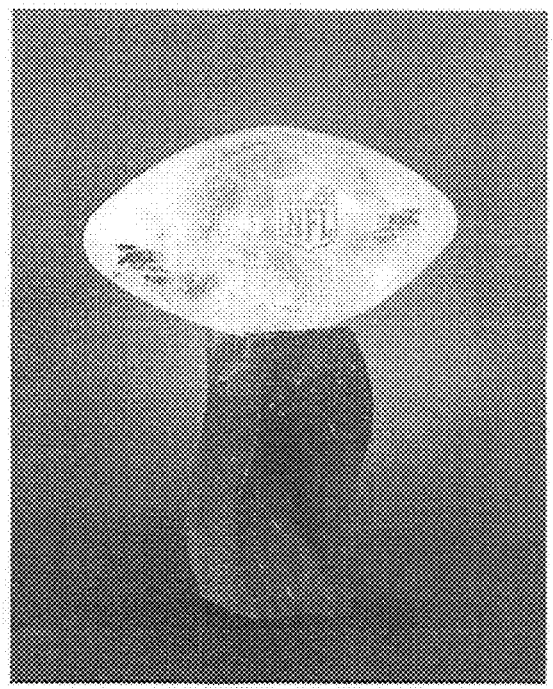
FIG. 2 is a front perspective view of an alternate embodiment of the customized piece of the present invention showing a football atop a support (stand)
Figure 3:
FIG. 3 is a front perspective view of an alternate embodiment of the customized piece of the present invention showing a disk shape on a support (stand)
Figure 4:
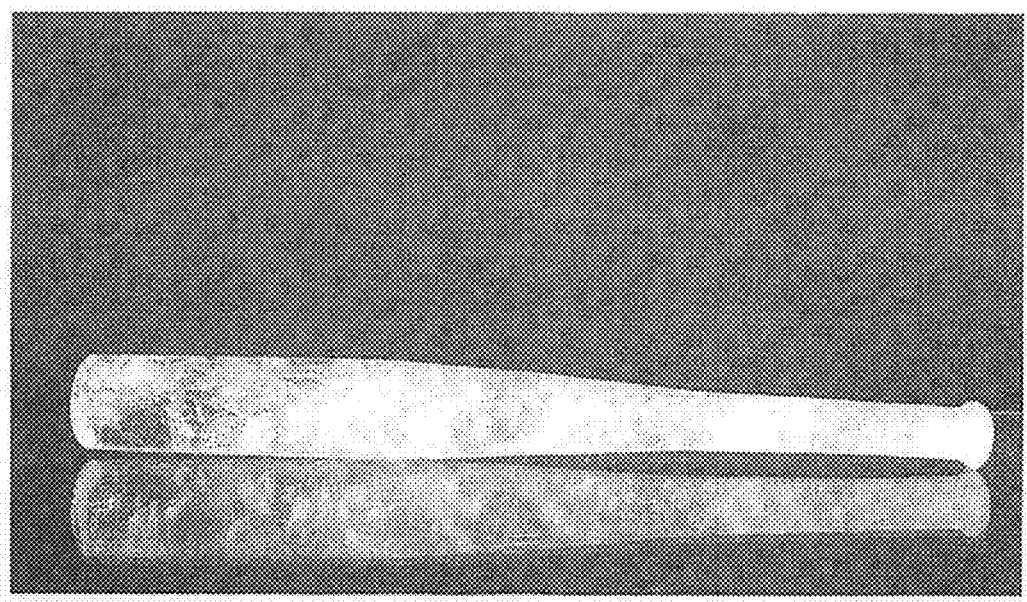
FIG. 4 is a side perspective view of an alternate embodiment of the customized piece of the present invention in the shape of a baseball bat formed from a single gemstone.

In the first step of forming the customized piece, the selected gemstone, preferably being quartz for the reasons enumerated above, is formed, i.e., carved/sculpted, into a desired shape (configuration) which can be in the sports memorabilia/sports entertainment field, the home decorative field, office decorative field and any other fields/applications. For example, in the sports field, the shape formed from the single gemstone (quartz) can be a baseball, baseball bat, golf club, football, tennis racquet and other sports related objects. The shape can also be in the form of a trophy or award which can include a pedestal or stand with a ball or other shaped object atop, all formed from the single piece of gemstone. Examples of such objects in the sports field are illustrated in FIGS. 1, 2 and 4. FIG. 1 shows a spherical shape, representing a ball, atop a support (stand), FIG. 2 shows a football atop a support (stand) having a wavy profile, and FIG. 4 shows two baseball bats (each formed from a single gemstone). In FIGS. 2 and 3, the stand can be a separate material from the sports object, but preferably the stand and the sports object are formed from a single piece of quartz. As can be appreciated, other shapes and various sizes of the objects can be formed to satisfy the personal requirements.

Figure 5:
FIG. 5 is a perspective view of an alternate embodiment showing a series of disk shaped customized pieces each formed from a single gemstone.
Figure 6:
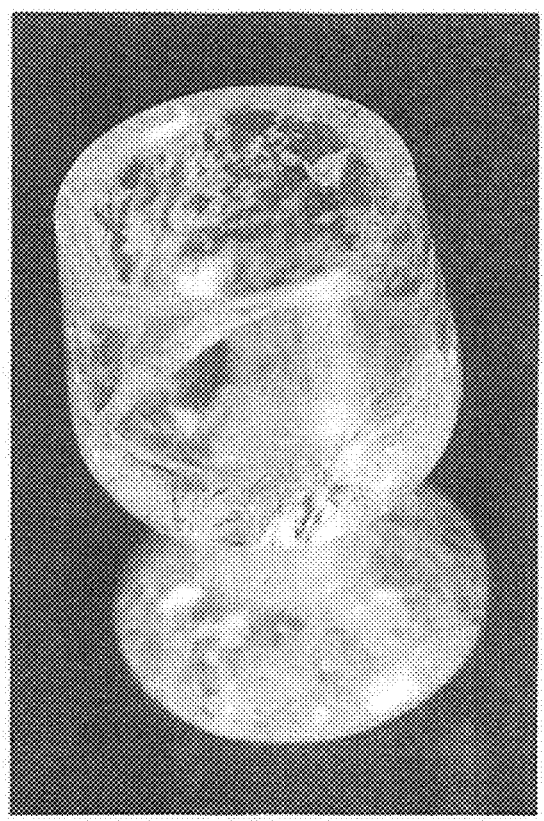
FIG. 6 is a front perspective of an alternate embodiment of the customized piece of the present invention in the form of a glass formed from a single gemstone.
Figure 7:
FIG. 7 is a front perspective of an alternate embodiment of the customized pieces of the present invention in the form of bowls each formed from a single gemstone.
Figure 8:
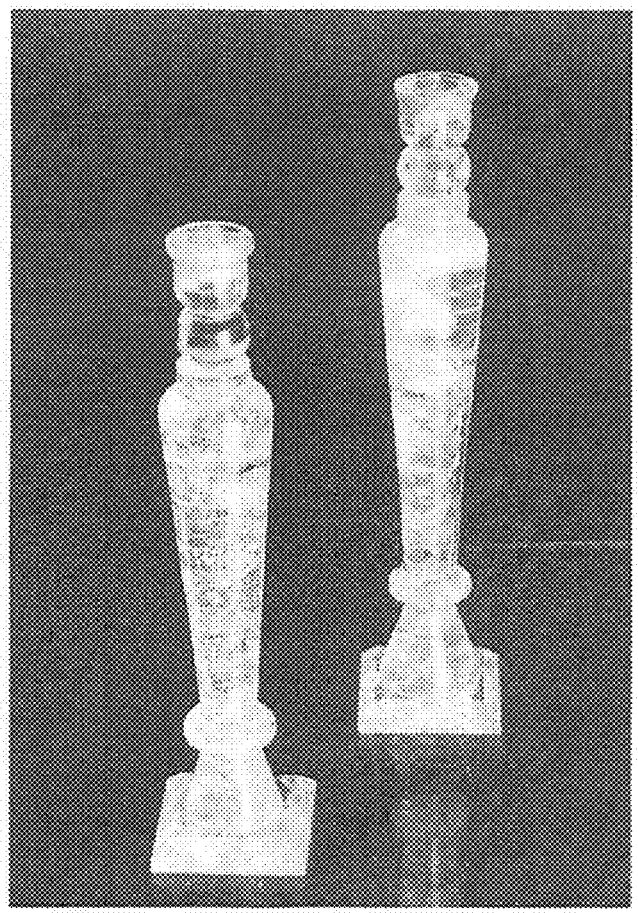

The gemstone (quartz) can also be carved into shapes in other fields, such as the home decorative fields or luxury goods, and the shape can be in the form for example of wine glasses, liquor glasses, bowls, candlesticks, coasters, plates, platters vases, etc. FIGS. 7-9 illustrate some examples. As can be appreciated, various simple shapes such as spheres or polyhedra as well as complex shapes can be formed from the quartz. The foregoing list is provided by way of example, as other shapes and forms depicting other items can be utilized, each item formed from a single piece of gemstone. For example, some other shapes can include a disk shape on a support/stand (formed from a single gemstone), a disk shaped customized piece (each disk shown formed from a single piece of gemstone) as illustrated in FIG. 5, a glass such as shown in FIG. 6, three bowls (each bowl formed from a single piece of gemstone) such as shown in FIG. 7 and a pair of candlesticks (each candlestick formed from a single piece of gemstone) such as shown in FIG. 8.

Note that these Figures illustrate a few possible shapes by way of example, it being understood that other shapes/configurations representing/depicting other objects as well as formations not depicting a specific known object can be formed. Various sizes are also contemplated. As noted above, the hardness of quartz provides shape stability during and after the formation process.

Although various sizes and shapes are contemplated, it has been found that a minimum thickness of the object is required to successfully shape the stone and successfully laser etch the information into the stone. More specifically, it has been found that a minimum thickness of ¼ inch ensures the stability of the quartz during the multiple step process of forming the finished product as described below.

After forming the gemstone into the desired shape as noted above, the next step of the process is applying the information to the gemstone which can include for example a logo, design and/or other personal information. This is achieved by an etching process. Use of standard etching techniques create risks in potentially damaging the stone and/or resulting in inconsistent results of the information etched into the gemstone. However, the etching of the stone is important to create the personalization, e.g., the desirable customization, of the item. Additionally, a more complex design could create more risks and more imperfections if improper etching techniques are used. Also, fine letters or numbers create risks of imperfections. Due to the expense of the gemstone, the customer demand for perfection of the customized information cannot be understated.

More specifically, the information etched into the gemstone can be useful for example in the award or trophy industry and well as in the gift industry. This information can include pictures, writing, logos, designs, insignia, etc., or any other information to personalize the gemstone. For example, in the sports field, the information can include specific stats or awards won by the athlete laced for example on items in the shape of sports equipment. Another example is for use as gifts, personal messages can be etched into the gemstone. The foregoing are just a few examples of the countless information that can be etched into the gemstone. The etching of the gemstone permanently applies the personalized information so it cannot be removed, e.g. rubbed off, over time. Its permanence is also static so that over time the personalized information does not degrade or lose its look or legibility.

It should be appreciated that compared to other materials, the quartz provides a strong surface for etching due to its being uniform directionally. However, although the strong material facilitates shaping of the stone into the desired shape/form, it can still splinter during the etching process. Therefore, prior to the performance of the etching process, the region (section) of the gemstone where the etching is going to be performed is covered with a protecting (masking) tape and a portion of the tape is vaporized with a laser, e.g. a CO2 laser, into a desired pattern, i.e., to cut the design/logo out of the tape. It is then blasted, e.g., sand/bead blasted. In one example, 100-120 grit Aluminum Oxide blast material at approximately 50 psi is used in order to extract the design/logo to make the etching deeper, and then the tape is removed. This leaves the etched information permanently (non-removably) in the gemstone. Preferably, the tape is placed to cover an area larger than the target area for laser etching so the tape protects the rest of the gemstone, i.e., the areas adjacent the etched region, from being damaged during the sand/bead blasting. Without the tape, the logo would splinter and/or fragment, especially on curved surfaces. In a preferred embodiment, the tape utilized is a water resistant and sand resistant film and is flexible and pliable to enable application to curved surfaces such as offered by RayZist in other applications The tape is applied to the surface to avoid trapped air. It has been found by the inventor that use of such tape on the gemstones allows symmetrical etching especially on curved surfaces The tape provides consistency of the etching process which in its absence would result in too much disparity, splintering and/or waste, which would increase the cost of manufacture and make the final product cost prohibitive. This etching is performed in a way so that the logo, writing, design, etc. does not splinter or fracture.

In the third step, after the areas of the logo/text are cut through on the tape by the laser, all the remaining surrounding areas of the tape (not laser etched) are cut away to expose the areas that are to be sand/bead blasted into the gemstone. Removal of the tape is a painstaking process as the tape must be finely cut away, preferably using a razor or knife, e.g., an Exacto knife. This step takes a considerable amount of time and needs be perfectly done or the final "reveal" will show the errors. The aforedescribed tape to date has been used on various materials such as crystal, glass or stone but its application to gemstone, and especially quartz, to successfully implement the etching process was unknown until the present invention.

The fourth step of the process for making the finished product advantageously enhances the visibility of the etching, especially on non-opaque gemstones such as the gemstone quartz mentioned above, so that it is viewable in different environments. In the absence of this third step, light is refracted through the fractures and inclusions of the logo/design to create a rainbow effect, therefore adversely affecting visibility. It is desirable that the finished item be displayed and be able to be viewed/read at a distance. It is also desirable that the finished product be able to be viewed under various lighting conditions, e.g., outside or inside in sunlight, various interior lighting, etc. As can be appreciated, the customers of the specialized pieces want to display the piece in prominent locations and do not want to be restricted in where they can be placed based on lighting conditions. To enhance visibility and ensure the piece can be viewed in varying conditions, the fourth step acts as a shield as it blocks refraction of light.

In this visibility enhancing step, a metallic sealant or covering such as a paste, polish, paint or wax, e.g., a silver based wax, is applied to the surface containing the etching, e.g., applied like a polish with a cloth or finger. The metallic sealant fills the voids over the entire etched design, and dries in a few seconds. In a preferred embodiment, the sealant includes beeswax (a natural wax formed by honey bees). Use of such sealant with beeswax allows it to penetrate and adhere to the porous surface of the gemstone (quartz) within seconds. Due to the unique chemical composition of quartz, the sealant, which is not water resistant, cures in a few seconds, a fraction of the time curing occurs on other surfaces. Thus, although the sealant to date has been used on various materials, its unique application to quartz, speeds up the manufacturing time of the finished product which advantageously reduces costs, while ensuring long term visibility of the etched personalized information.

The portions of the sealant that are not in the etching but are on the surface of the gemstone can be wiped off with a cloth, leaving the etching filled with the sealant. In this manner, the application of the finishing/sealant coat (covering) actually extracts the image of the logo which would otherwise not be as visible. After application of the coating, the piece is now in the form of a finished product ready for shipping to a customer.

Figure 9:
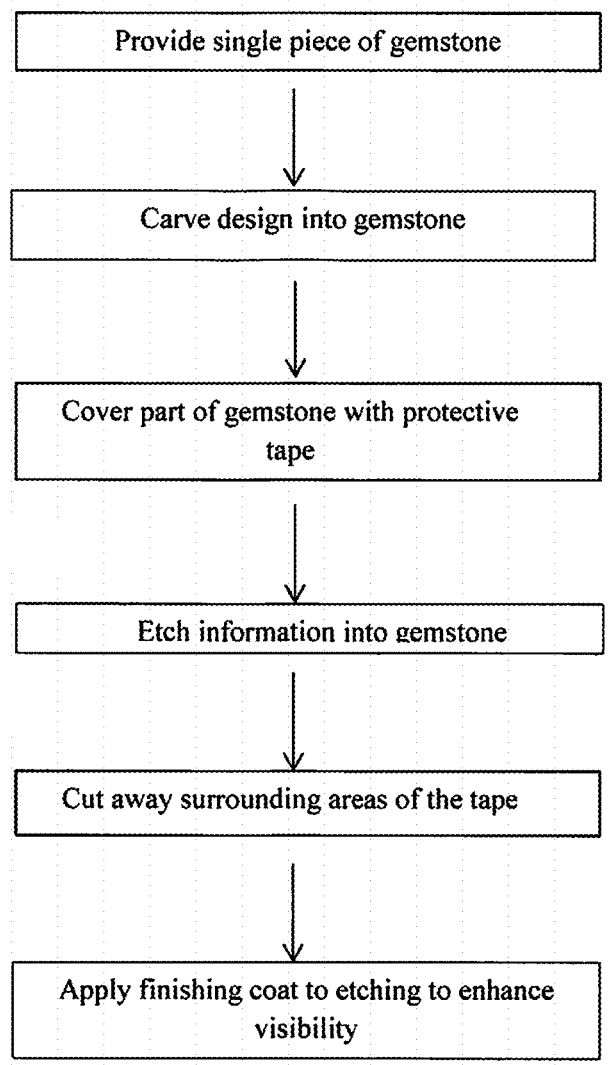
FIG. 9 is a flow chart illustrating the steps of forming a customized piece in accordance with the manufacturing method of the present invention.

The flow chart of FIG. 9 illustrates the steps in forming the customized product. In a single piece of gemstone, in the first step, the design is carved into the gemstone to form the desired shape of the object. In the next step, the designated portion of the gemstone is covered with protective tape. In the following step, the personalized information is etched into the gemstone through the tape as described above. Next, the areas of the tape surrounding the etched are carefully removed. In the last step, a special beeswax coating is applied to the etching to enhance visibility.

The gemstone, in a fifth optional step can be autographed such as with a marker pen, e.g., a sharpie, or other writing implement. The marker quickly dries on the gemstone and cannot be wiped off/removed.

The finished product has many applications as described above. It can for example be used as a trophy or an award. It can also be used as a personalized decorative item. It can also provide a personalized gift, such as to an athlete where the logo can contain information regarding the sports career, such as one or more of a college logo, professional team, personal stats, awards, etc. It can be a collectible or autographed to increase the marketing value.

Note the gemstone can be carved into an infinite number of shapes and sizes, symmetrical and asymmetrical, with just a few mentioned above and illustrated in the drawings. These shapes of the custom pieces, as noted above, can provide, for example, the image of an object atop a platform, tablet or pedestal, can be in the shape of a specific article/object, a random shape not depicting a specific object, etc. By using a single gemstone to form the finished product, there is no gluing or other attachment methods required. By using quartz, the stability and integrity of the product during manufacturing, shipping and handling by the consumer is maintained. By using the specialized tape, consistent accurate etching is performed without damaging the quartz. By using the beeswax coating, the personalized information is viewable in different environments.

While the above description contains many specifics, those specifics should not be construed as limitations on the scope of the disclosure, but merely as exemplifications of preferred embodiments thereof. Those skilled in the art will envision many other possible variations that are within the scope and spirit of the disclosure as defined by the claims appended hereto.

What is claimed is:

1. A method of making a customized item from a single piece of quartz, the method comprising the steps of:
   providing a piece of quartz of sufficient size and shape to form the item;
   carving the item out of the single piece of quartz into a desired shape;
   etching information into the item; and
   applying a coating to the information after the step of etching the information to form the customized item.

2. The method of claim 1, further comprising the step of placing a tape over a region of the quartz and etching the information into the tape.

3. The method of claim 2, further comprising the step of cutting away the tape surrounding the information leaving areas of the tape overlying the etching in the quartz.

4. The method of claim 1, where the step of etching the information includes laser etching the information into the item.

5. The method of claim 1, wherein the item has a thickness equal to or greater than ¼ inch.

6. The method of claim 1, wherein the coating is a sealant applied like a polish to block refraction of light.

7. The method of claim 1, wherein the step of applying the coating applies the coating to voids in the etched information and extracts the image formed of the etched information.

8. The method of claim 7, wherein the coating is beeswax.

9. The method of claim 1, wherein the tape is applied to the quartz in a manner to avoid trapping air under the tape.

10. The method of claim 1, wherein the coating is a beeswax.

11. The method of claim 1, wherein the customized item is a trophy.

12. The method of claim 1, wherein the customized item is in the shape of a sports object.

13. The method of claim 1, wherein the customized item is the desired shape of a glass or bowl.

14. The method of claim 3, where the step of etching the information includes laser etching the information into the item.

15. The method of claim 3, wherein the coating is a sealant applied like a polish to block refraction of light.

16. The method of claim 4, wherein the item has a thickness equal to or greater than ¼ inch.

17. The method of claim 2, where the step of etching the information includes laser etching the information into the item.

18. The method of claim 4, wherein the coating is a sealant applied like a polish to block refraction of light.

19. The method of claim 6, wherein the step of applying the coating applies the coating to voids in the etched information and extracts the image formed of the etched information.

* * * * *